United States Patent
Sawano et al.

(10) Patent No.: US 11,126,920 B2
(45) Date of Patent: Sep. 21, 2021

(54) INTERACTION SCENARIO DISPLAY CONTROL METHOD AND INFORMATION PROCESSING APPARATUS

(71) Applicant: FUJITSU LIMITED, Kanagawa (JP)

(72) Inventors: Yoshinobu Sawano, Sunnyvale, CA (US); Sanae Soma, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 934 days.

(21) Appl. No.: 15/593,962

(22) Filed: May 12, 2017

(65) Prior Publication Data

US 2018/0330252 A1    Nov. 15, 2018

(51) Int. Cl.
| | | |
|---|---|---|
| *G06N 3/00* | (2006.01) | |
| *G06N 5/04* | (2006.01) | |
| *G06N 20/00* | (2019.01) | |
| *G06F 16/242* | (2019.01) | |
| *G06F 3/0482* | (2013.01) | |
| *G06F 3/0481* | (2013.01) | |
| *G06Q 40/00* | (2012.01) | |

(52) U.S. Cl.
CPC .......... *G06N 5/045* (2013.01); *G06F 3/0482* (2013.01); *G06F 16/2428* (2019.01); *G06N 3/006* (2013.01); *G06N 20/00* (2019.01); *G06F 3/04817* (2013.01); *G06Q 40/00* (2013.01)

(58) Field of Classification Search
CPC ................................. G10L 15/22; G06N 3/006
See application file for complete search history.

(56) References Cited

U.S. PATENT DOCUMENTS

| | | | | |
|---|---|---|---|---|
| 2003/0065600 A1* | 4/2003 | Terashima | ............. | G06Q 40/06 705/36 R |
| 2010/0049517 A1 | 2/2010 | Huang et al. | | |
| 2012/0041903 A1* | 2/2012 | Beilby | ................... | G06N 3/004 706/11 |
| 2014/0122619 A1* | 5/2014 | Duan | ...................... | G06F 40/20 709/206 |
| 2015/0350436 A1 | 12/2015 | Vymenets et al. | | |

(Continued)

FOREIGN PATENT DOCUMENTS

| | | |
|---|---|---|
| JP | 2010-73191 A | 4/2010 |
| WO | 2010/078614 A1 | 7/2010 |

OTHER PUBLICATIONS

Google, "Introducing Flow Visualization: Visualizing Visitor Flow", Oct. 19, 2011, pp. 1-6 (Year: 2011).*

(Continued)

*Primary Examiner* — Paulinho E Smith
(74) *Attorney, Agent, or Firm* — Westerman, Hattori, Daniels & Adrian, LLP

(57) ABSTRACT

A non-transitory recording medium for recording an interaction scenario display control program, which when executed causes a computer to control according to an input of an interaction scenario having a plurality of branches that is stored in a storage unit which branch is to be selected to display corresponding contents and to store information specifying a selected branch in the storage unit, and to generate and display a display screen on which information indicating which branch of the interaction scenario has been selected and how many times it has been selected is displayed by using letters or illustrations by referring to information stored in the storage unit.

15 Claims, 7 Drawing Sheets

(56) References Cited

U.S. PATENT DOCUMENTS

2018/0101789 A1* 4/2018 Soma ................... G06N 5/022
2018/0212904 A1* 7/2018 Smullen ................ H04L 63/18
2018/0330252 A1* 11/2018 Sawano ............. G06F 16/2428

OTHER PUBLICATIONS

Office Action dated Mar. 25, 2019, issued in counterpart EP application No. 18 165 412.0. (7 pages).
Office Action dated Nov. 26, 2019, issued in counterpart EP application No. 18165412.0, with English translation. (9 pages).
Extended European Search Report dated Jul. 10, 2018, issued in counterpart application No. 18165412.0. (8 pages).
Lokman, A.S., et al., "An Architectural Design of Virtual Dietitian (ViDi) for diabetic patients", Computer Science and Information Technology, ICCSIT 2009. 2nd IEEE International Conference on, IEEE, Piscataway, NJ, USA, Aug. 8, 2009, pp. 408-411, XP031527276, (4 pages).

\* cited by examiner

INTERACTION SCENARIO DISPLAY CONTROL METHOD AND INFORMATION PROCESSING APPARATUS

FIELD

The embodiment discussed herein is related to a recording medium having recorded therein an interaction scenario display control program, an interaction scenario display control method, and an information processing apparatus.

BACKGROUND

In recent years, there has been proposed a service such as a chat application that uses a robot referred to as "chatbot" based on know-how of experts who have a large amount of knowledge to answer an inquiry from a user based on an interaction scenario. The operation of the chatbot is controlled by a script using, for example, a programming language or a script language. In order to generate such a script, for example, there has been known a method such as hard coding that directly describes a script by a programming language or a script language or cordless coding in which icons are arranged by using a GUI (Graphical User Interface).

[Patent Literature 1] Japanese Laid-open Patent Publication No. 2010-73191

However, for example, as for a script of an interaction scenario for which operation has been started once, information regarding which option has been selected is acquired from a log of a large, quantity of chatbots. However, it is difficult to browse the information corresponding to the option collectively.

SUMMARY

According to an aspect of an embodiment, a non-transitory recording medium records therein an interaction scenario display control program that causes a computer to execute a process including: controlling, according to an input, which branch is to be selected to display corresponding contents, of an interaction scenario having a plurality of branches that is stored in a storage unit; storing information specifying a selected branch in the storage unit; and generating and displaying a display screen on which information indicating which branch of the interaction scenario has been selected and how many times it has been selected is displayed by using letters or illustrations, at a time of generating letters or marks corresponding to each of the branches and displaying a flow of the interaction scenario, by referring to information stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a recording medium having recorded therein an interaction scenario display control program, an interaction scenario display control method, and an information processing apparatus disclosed in the present application will be explained below in detail with reference to the accompanying drawings. The disclosed techniques are not limited to the embodiments. These embodiments described below may be combined with each other as appropriate within a scope in which no contradiction occurs.

Figure 1:
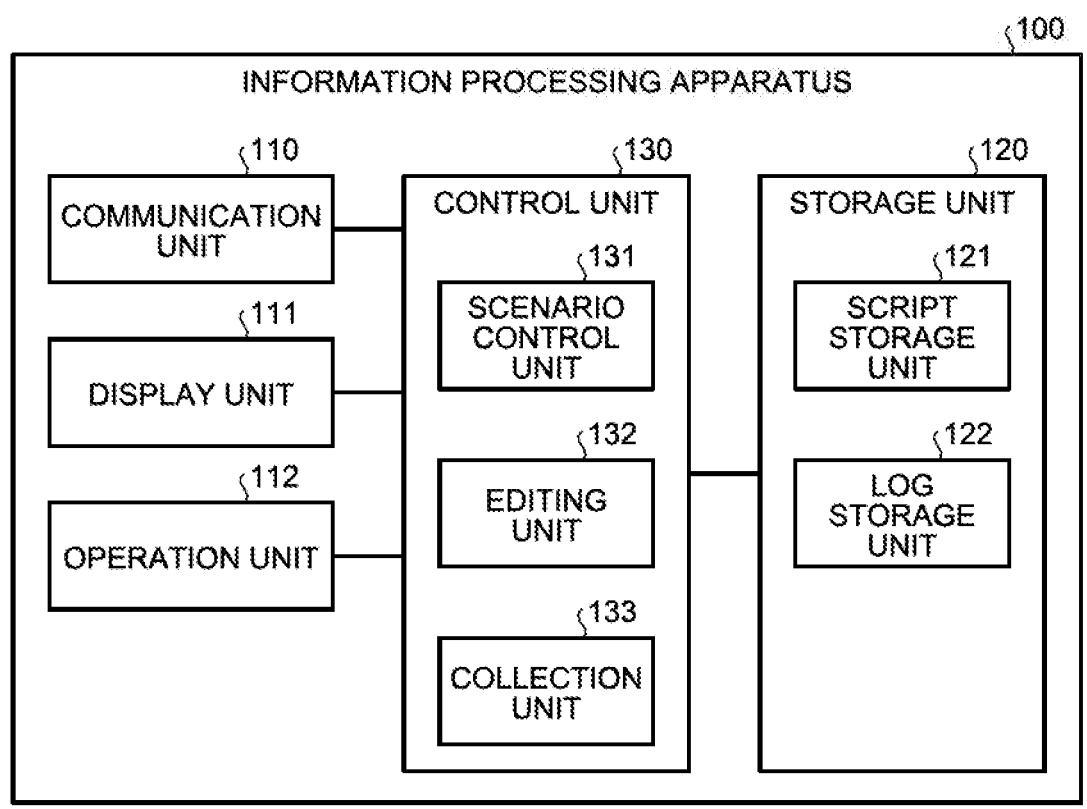
FIG. 1 is a block diagram illustrating an example of a configuration of an information processing apparatus according to an embodiment.

FIG. 1 is a block diagram illustrating an example of a configuration of an information processing apparatus according to an embodiment of the present invention. An information processing apparatus 100 illustrated in FIG. 1 is an information processing apparatus that can execute a chatbot that provides contents based on, for example, an interaction scenario, and can perform generation and editing works of a script of an interaction scenario that executes control of the chatbot. The information processing apparatus 100 controls, of an interaction scenario having a plurality of branches stored in a storage unit, which branch is to be selected to display corresponding contents according to an input. The information processing apparatus 100 stores information specifying the selected branch in the storage unit. When the information, processing apparatus 100 generates letters or marks corresponding to each of the branches and displays a flow of the interaction scenario, the information processing apparatus 100 refers to the information stored in the storage unit to generate and display a display screen on which information indicating which branch of the interaction scenario has been selected and how many times it has been selected is displayed, by using letters or illustrations. Due to this configuration, the information processing apparatus 100 can support the editing work of an interaction scenario.

The configuration of the information processing apparatus 100 is described next. As illustrated in FIG. 1, the information processing apparatus 100 includes a communication unit 110, a display unit 111, an operation unit 112, a storage unit 120, and a control unit 130. It is also possible that the information processing apparatus 100 includes, other than the functional units illustrated in FIG. 1, known various functional units provided in a computer, such as various types of input devices and voice output devices.

The communication unit 110 is realized by, for example, an NIC (Network Interface Card). The communication unit 110 is a communication interface that is connected, to other information processing apparatuses via a network, (not illustrated) in a wired or wireless manner so as to manage information communication with other information processing apparatuses. When data of a chat screen of a chatbot is input, for example, from the control unit 130, the communication unit 110 transmits the input data of the chat screen to other information processing apparatuses. Further, upon reception of input, information such as options and a sentence on the chat screen from other information processing apparatuses, the communication unit 110 outputs the received input information to the control unit 130.

The display unit 111 is a display device for displaying various types of information. The display unit 111 is realized by, for example, a liquid crystal display as the display device. The display unit 111 displays various screens such as an editing screen input from the control unit 130.

The operation unit 112 is an input device that accepts various operations from an administrator of the information processing apparatus 100. The operation unit 112 is realized by, for example, a keyboard and a mouse as the input device. The operation unit 112 outputs the operation input by the administrator to the control unit 130 as operation information. The operation unit 112 can be realized by a touch panel or the like as an input device, and the display device of the display unit 111 and the input device of the operation unit 112 can be integrated with each other.

The storage unit 120 is realized by, for example, a semiconductor memory device such as a RAM (Random Access Memory) or a flash memory, or a storage device such as a hard disk or an optical disk. The storage unit 120 includes a script storage unit 121 and a log storage unit 122. The storage unit 120 stores therein information to foe used for processing by the control unit 130.

The script storage unit 121 stores therein a script that defines an interaction scenario for each chatbot. In the following descriptions, the script that defines an interaction scenario may be expressed simply as "script". The script to be stored in the script storage unit 121 is described by, for example, a programming language or a script language. As such a language, for example, Perl and PHP can be exemplified. The script defines the operation of the chatbot, and for example, it can define such that, when an option is selected as an input, a message corresponding to the selected option is output.

The log storage unit 122 stores therein a log that is related to the operation of a chatbot in association with the chatbot. That is, the log storage unit 122 stores therein a log related to the operation of a script in association with the script. The log to be stored in the log storage unit 122 includes pieces of information, for example, an identifier of a chatbot (script), a time regarding input/output, a time taken to select options, and a selected option.

The control unit 130 is realized by, for example, a CPU (Central Processing Unit) or an MPD (Micro Processing Unit), to execute a program stored in the internal storage device by using a RAM as a work area. Further, the control unit 130 can be also realized by an integrated circuit such as an ASIC (Application Specific Integrated Circuit) or an FPGA (Field Programmable Gate Array).

The control unit 130 includes a scenario control unit 131, an editing unit 132, and a collection unit 133, and realizes or executes functions and operations of the information processing described below. The internal configuration of the control unit 130 is not limited to the configuration illustrated in FIG. 1, and can be other configurations as long as the information processing described below is performed.

The scenario control unit 131 executes the script stored in the script storage unit 121 so as to provide a chat service based on the interaction scenario to other information processing apparatuses (not illustrated). The scenario control unit 131 transmits data of a chat, screen of the script to be performed, to other information processing apparatuses (not illustrated) via the communication unit 110. Further, the scenario control unit 131 receives input information such as options and sentences on the chat screen from other information processing apparatuses (not illustrated) via the communication unit 110, and reflects the received input information on the operation of the script. That is, the scenario control unit 131 controls, according to the input, which branch is to be selected to display the corresponding contents, of the interaction scenario (script) having a plurality of branches stored in the script storage unit 121.

The editing unit 132 performs a script editing process of generating and editing the script of a chatbot. The editing unit 132 provides a script editing function to the administrator of the information processing apparatus 100, such as a hot designer who edits the script. When the bot designer instructs to generate a new script, the editing unit 132 displays an editing screen of a new script on the display unit 111.

Figure 2:
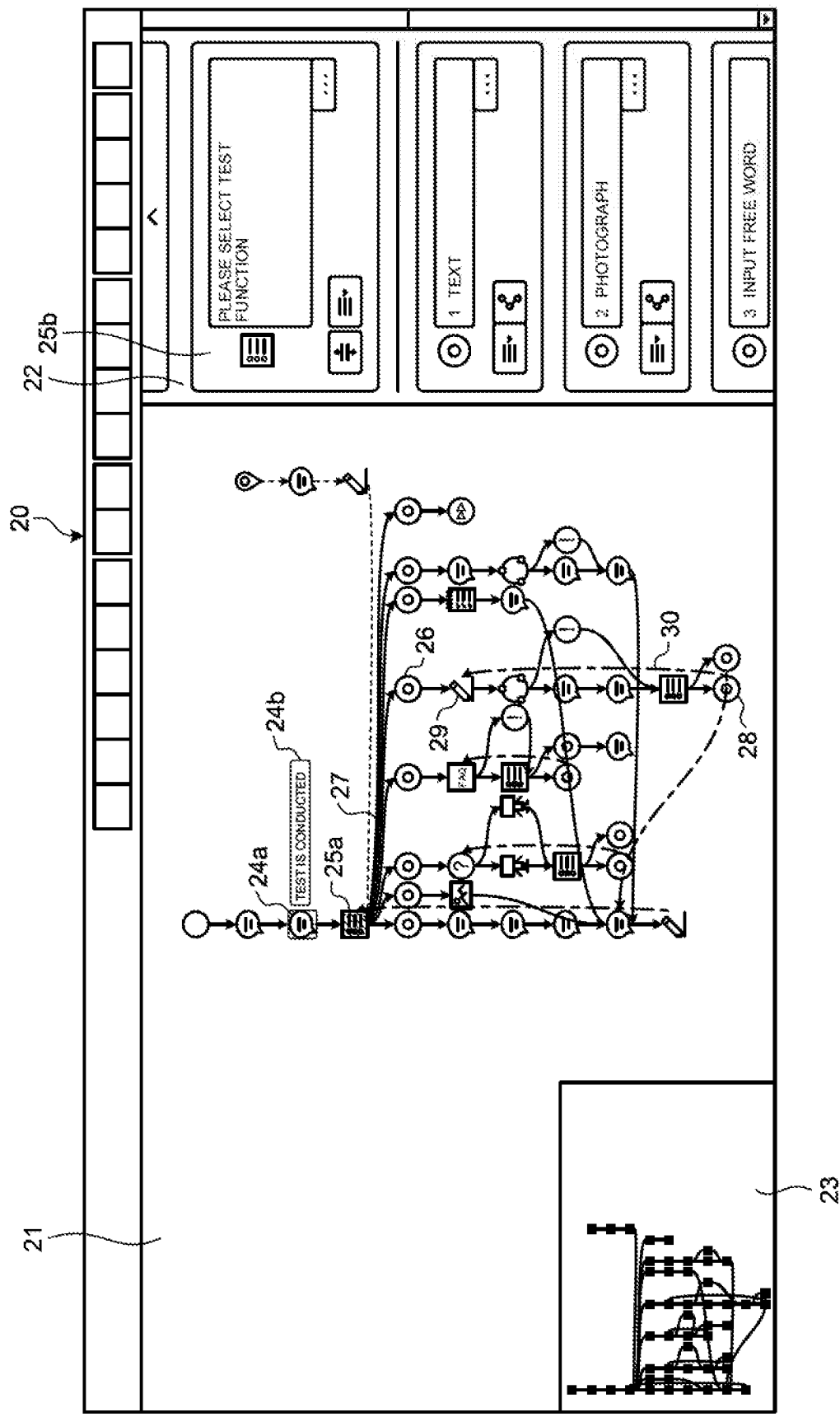
FIG. 2 is a diagram illustrating an example of an editing screen at the time of generating a script.

Generation of a script is described with reference to FIG. 2. FIG. 2 is a diagram illustrating, an example of an editing screen at the time of generating a script. An editing screen 20 illustrated in FIG. 2 is an example of an editing screen, representing a state where the new script is being edited. The editing screen 20 includes a map area 21 and a content area 22. In the map area 21, a script is displayed by using a map including nodes indicating reception of an input or an output of contents and paths (connecting lines) between the nodes. In the content area 22, functions of the node selected in the map area 21 are displayed in an editable manner. Further, in the map area 21, a map of the entire script is displayed in a reduced size in an area 23.

In the editing screen 20, for example, when a mouse is placed over a node 24a in which an input of a text has been completed, an input text 24b is displayed. The node 24a is a node expressing a text display. A node 25a is a node indicating a single option in which one of a plurality of options can be selected. An editing field 25b corresponding to the node 25a indicates a state in which a text "please select test function" displayed at the time of displaying the options is input. Similarly, as for each option not illustrated in the drawings, editing can be performed in a corresponding editing field. A node 26 is a node expressing editing of an option corresponding to one of the options of the node 25a and is connected to the node 25a by a path 27. Similarly, the node 25a is connected to nodes expressing the editing of options of other seven options respectively by a path.

On the editing screen 20, for example, when the mouse is placed over the node 25a, paths belonging to an upstream and a downstream of the node 25a are displayed identifiably from other paths. A path 30 from a node 28 to a node 29 indicates returning to the node 23 when an option of the node 28 is selected. The node 29 is a node expressing that an input text is defined as a variable. For example, when the node 28 is an option to correct a sentence having been input in the node 29, correction of the sentence can be performed by returning to the node 29 by the path 30.

Referring back to the explanation of FIG. 1, editing of an existing script by the editing unit 132 is described. Upon reception of editing start of an existing script from a bot designer, the editing unit 132 acquires a script for which editing start has been received from the script storage unit 121. The editing unit 132 displays the editing screen of the acquired script on the display unit 111.

The editing unit 132 displays the script displayed in the map while changing the thickness of each path depending on the number of passages in each path, that is, the number of outputs of the contents based on an acquired log. Further, when, each path is selected, the editing unit 132 displays data corresponding to the selected path. The data to be displayed includes, for example, the number of passages in the selected path, and an average value and a median value of the time since display of a screen to receive an input until reception of the input.

The editing unit 132 receives, as for the script displayed in the map, pieces of information regarding addition, change, and deletion of an icon indicating a node, setting of a path between nodes, and input/output in each node, that is, editing of chat contents. As the types of the nodes, for example, text display, image display, a single option, editing of respective options of a single option, defining an input text as a variable, free word input, and editing of a robot response can be exemplified. Further, as the types of the nodes, for example, an FAQ (Frequently Asked Questions) engine, service cooperation for cooperating with other services, a plurality of options such as check boxes, and an error message can be exemplified.

In other words, the editing unit 132 generates letters or marks corresponding to a plurality of branches, and displays a flow of an interaction scenario. When displaying the flow of the interaction scenario, the editing unit 132 refers to information, stored, in the log storage; unit 122 to generate and display a display screen on which information indicating which branch of the interaction scenario has been selected and how many times it has been selected by using letters or illustrations is displayed. The display screen is an editing screen of the script described above. The letters or marks corresponding to each of the branches correspond to the node described above. The information indicating which branch has been selected and how many times it has been selected corresponds to the thickness of the path described above and the data corresponding to the selected path. Further, the branch includes a branch by the single option described above, and a branch to a robot response by means of free word input.

The editing unit 132 determines whether an editing end operation has been received from a bot designer. If the editing end operation has not been received, the editing unit 132 continues to edit the script. If the editing end operation is received, the editing unit 132 stores the edited script in the script storage unit 121 and finishes the script editing process.

Figure 3:
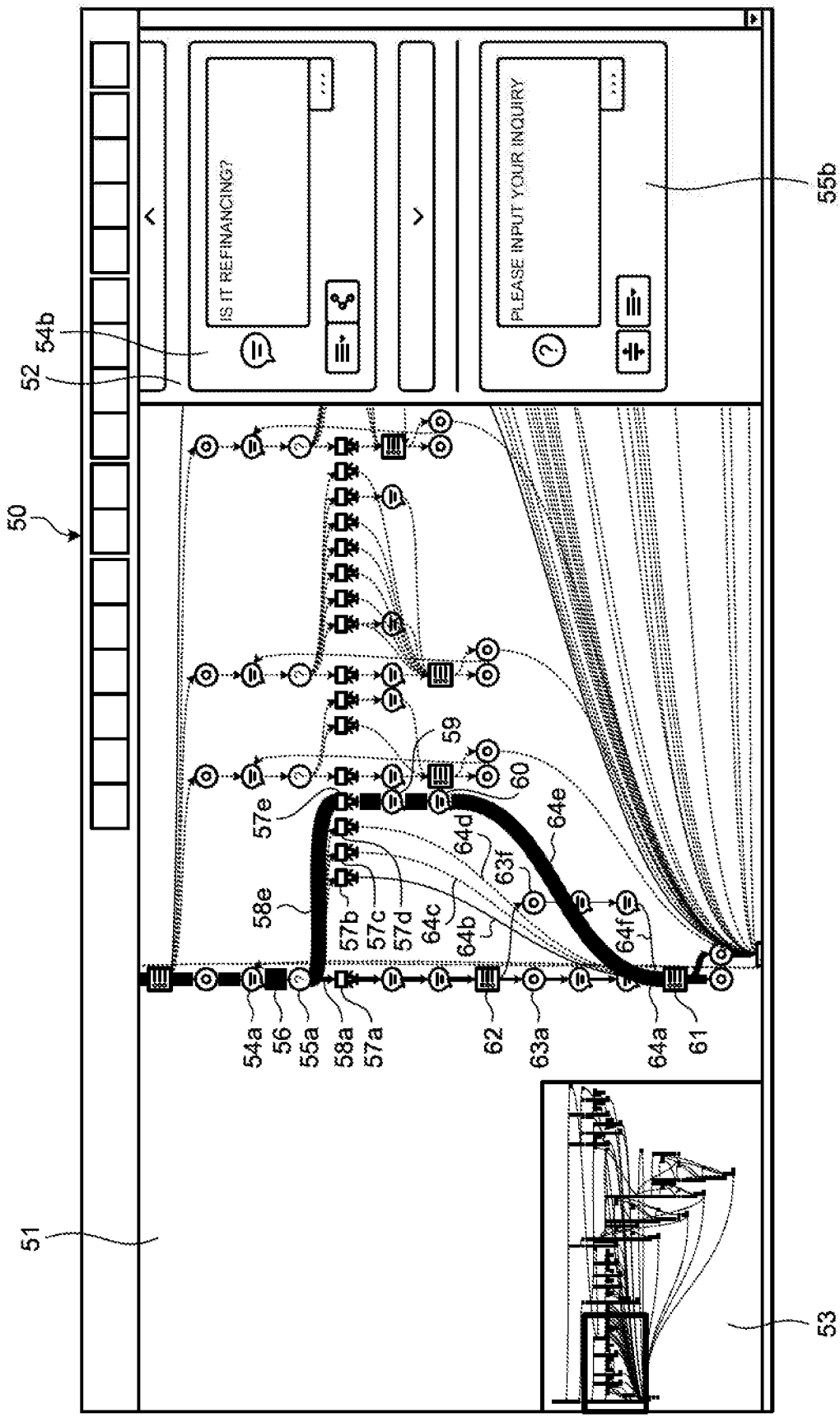
FIG. 3 a diagram illustrating an example of an editing screen for editing a script.
Figure 4:
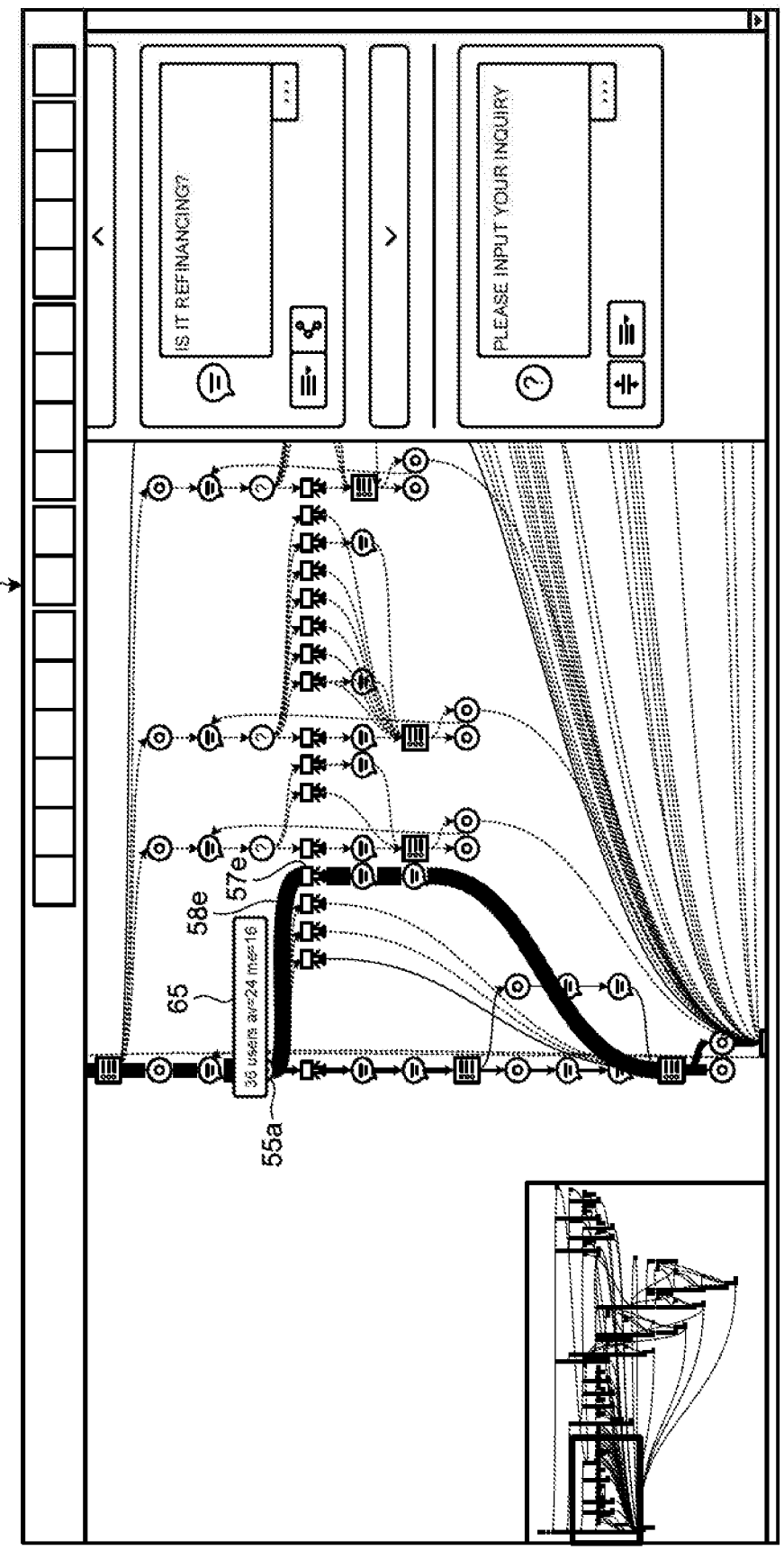
FIG. 4 is a diagram illustrating an example of an editing screen on which data corresponding to a selected path is displayed.

A case where a path is displayed by changing the thickness thereof is described here with reference to FIG. 3 and FIG. 4. FIG. 3 a diagram illustrating an example of an editing screen for editing a script. An editing screen 50 illustrated in FIG. 3 is an example of an editing screen representing a state in which an existing script for which operation has been started once is being edited. The editing screen 50 includes a map area 51 and a content area 52. In the map area 51, a script is displayed by using a map including nodes and paths. In the content area 52, a function of the node selected in the map area 51 is displayed in an editable manner. Further, a map of the entire script is displayed in a reduced size in an area 53 of the map area 51.

In the editing screen 50, a node 54a is a node indicating text display, where a text displayed in an editing field 54b can be edited. A node 55a is a node indicating free word input, where a display prompting free word input can be edited in an editing field 55b. A path 56 connects the node 54a and the node 55a to each other, and is expressed by a thickness corresponding to the number of passages in the path 56.

In the node 55a, five types of response patterns of a robot based on the free word input are provided, and nodes 57a to 57e are respectively nodes for editing the robot response corresponding to each of the response patterns. That is, the node 55a and the nodes 57a to 57e are branches to be selected according to a determination result by an artificial intelligence, and are nodes in a display mode different from, branches by a single option, such, as the node 25a and the node 26 in the editing screen 20 in FIG. 2.

A path 58a connects the node 55a and the node 57a to each other, and is expressed by a thickness corresponding to the number of passages in the path 58a. Similarly, a path 58e connects the node 55a and the node 57e to each other, and is expressed by a thickness corresponding to the number of passages in the path 58e. In the editing screen 50, when comparing the path 58a and the path 58e with each other, the path 58e is expressed in a thicker mode. This means that the response pattern of the node 57e has been selected most frequently as a response pattern to the free word input in the node 55a. In the editing screen 50, the path from the node 55a to the nodes 57b, 57c, and 57d is thinner than the path 58a, and is hidden behind the path 58e.

Next, in the editing screen 50, when following a route including the path 53e and the node 57e, the route passes nodes 59 and 60 and reaches a node 61 without branching during the following. Further, in the editing screen 50, when following a route including the path 58a and the node 57a, branching occurs in a node 62. The node 62 is a single option having two options, and branches to a node 63a corresponding to one of the options and a node 63f corresponding to the other one of the options. Thereafter, the respective branched routes reach the node 61. That is, a path 64a via the node 63a, a path 64b via the node 57b, and a path 64c via the node 57c are connected to the node 61. Further, a path 64d via the node 57d, a path 64e via the node 60, and a path 64f via the node 63f are connected to the node 61. In this case, the respective thicknesses of the path 64a to 64f are in order of the paths 64e, 64a, 64f, 64b, 64c, and 64d from the thickest path. That is, in the script being edited on the editing screen 50, it can be discriminated at a glance that the route via the node 57e is the route most frequently passed. Such a display corresponding to the number of passages in the respective paths, that is, by means of the thickness of the path corresponding to the number of times the path has been selected can be also used for the path belonging to the route passing through the path, when the mouse is placed over the path.

FIG. 4 is a diagram illustrating an example of an editing screen on which data corresponding to a selected path is displayed. FIG. 4 illustrates a state in which a path 58e is clicked and selected by, for example, a mouse operation on the editing screen 50. In the state in which the path 58e has been selected, a label 65 displaying data corresponding to the path 58e is displayed near the path 58e. On the label 65, for example, the number of passages in the path 58e "36 users", and ah average value "av=24" and a median value "me=16" of the time since display of a screen for receiving an input until reception of the input are displayed. That is, it is understood, according to the label 65, that the number of branches to a response pattern of the node 57e is 36 in the node 55a. Similarly, it is understood, according to the label 65, that an average value of the time since display of the reception screen of free word input in the node 55a until reception of the input of a free word is 24 seconds and a median value thereof is 16 seconds.

With reference to the examples in FIG. 3 and FIG. 4, the function of the editing unit 132 can be rephrased as follows. The editing unit 132 displays the time taken to select a branch on the generated display screen. The editing unit 132 displays the number of times the branch has been selected on the generated display screen. On the display screen displayed by the editing unit 132, an illustration of information indicating which branch has been selected and how many times it has been selected is a connecting line that connects letters or marks corresponding to each of the branches with each other. On the display screen displayed by the editing unit 132, the width, of the connecting line is displayed thicker with an increase in the number of times the branch has been, selected. When a plurality of branches are branches selected according to a determination result by an artificial intelligence, the editing unit 132 displays the branches in a display mode different from a branch selected unambiguously according to an input.

Returning to the explanation of FIG. 1, the collection unit 133 collects scripts executed by the scenario control unit 131, that is, logs regarding the operation of a chatbot. The collection unit 133 stores the collected logs in the log storage unit 122 in association with the chatbot. In other words, the collection unit 133 stores information specifying the selected branch in the interaction scenario of the script executed by the scenario control unit 131 in the log storage unit 122.

Figure 5:
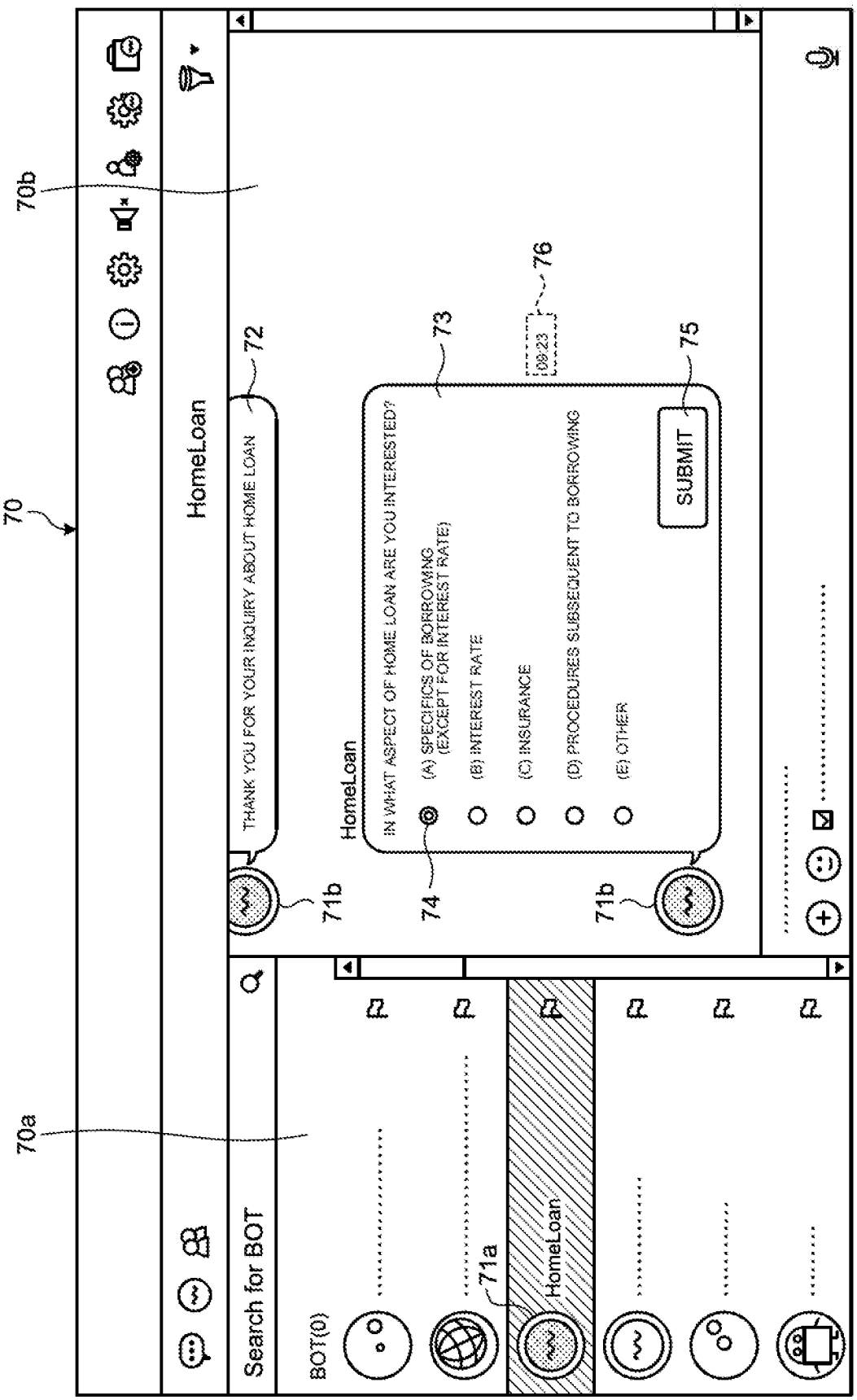
FIG. 5 is a diagram illustrating an example of a script operation screen.

A script operation screen that is a base of a log, that is, a chat screen is described with reference to FIG. 5. FIG. 5 is a diagram illustrating an example of a script operation screen. A chat screen 70 illustrated in FIG. 5 is an example of a chat screen of a chatbot corresponding to an inquiry about home loan. The chat screen is displayed on another information processing apparatus (not illustrated) used by a user, who is a customer of a bank providing a home loan. The information processing apparatus used by the user is connected, to the information processing apparatus 100 via a network (not illustrated).

The chat screen 70 includes a chatbot list area 70a in which a list of chatbots is displayed and a chat area 70b in which chat contents are displayed. On the chat screen 70, the user first selects a chatbot 71a. Thereafter, on the chat screen 70, an icon 71b indicating the chatbot 71a and contents 72 corresponding to the icon 71b are displayed in the chat area 70b. The contents 72 is, for example, a sentence like "Thank you for your inquiry about home loan.".

Subsequently, the chatbot 71a displays the icon 71b and contents 73 corresponding to the icon 71b. The contents 73 indicate, for example, a single option and include options (A) to (E) regarding the home loan. A radio button for receiving selection by the user is provided to each of the options (A) to (E). The example of the chat screen 70 is in a state in which a radio button 74 has been selected. Further, the contents 73 includes a button 75 for transmitting input information to the chatbot 71a that is operated in the information processing apparatus 100. In the contents 73, for example, the radio button 74 is selected and the button 75 is pressed, thereby transmitting the input information, indicating that, the option (A) has been selected, to the information processing apparatus 100. Near the contents 73, there is displayed time information 76 indicating the time when the contents 73 are displayed.

Figure 6:
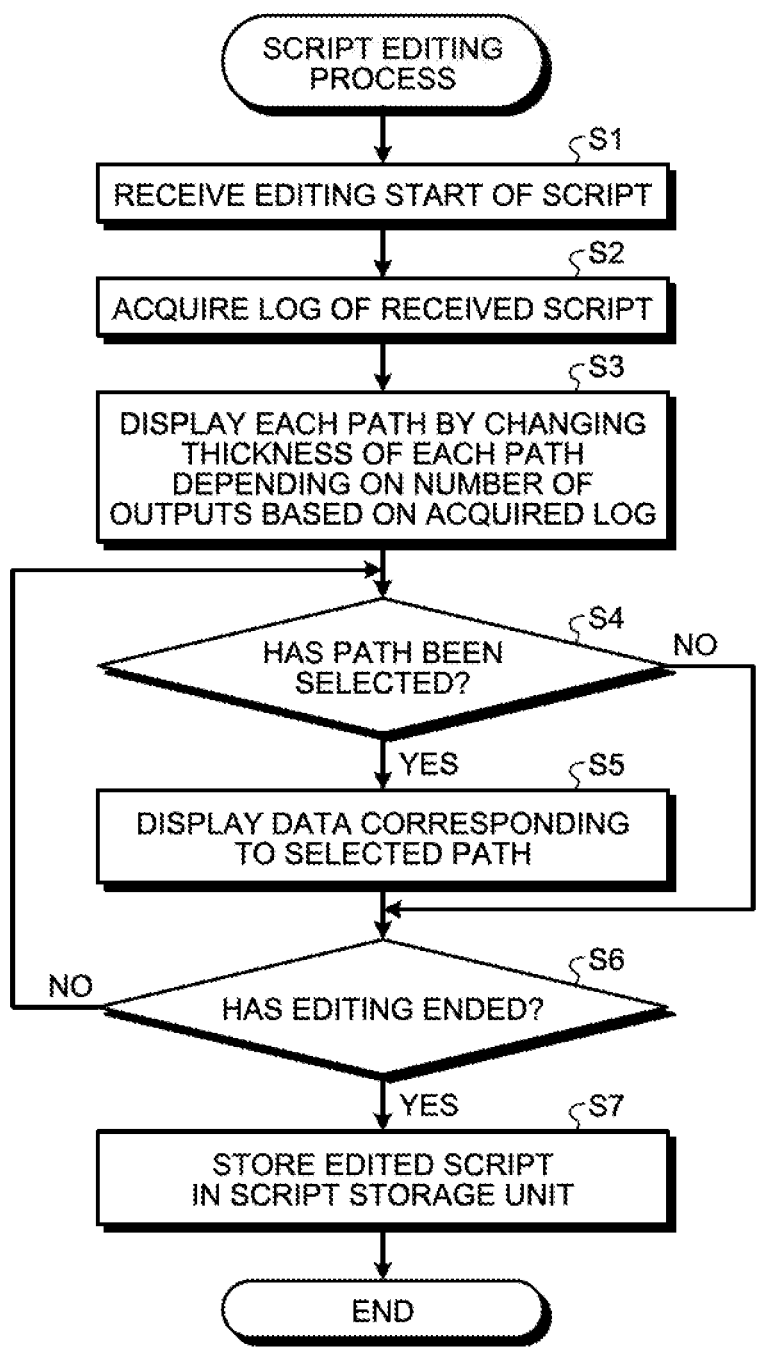
FIG. 6 is a flowchart for illustrating an example of a script editing process of the embodiment.

Operations of the information processing apparatus 100 according to the present embodiment are described next. FIG. 6 is a flowchart for illustrating an example of a script editing process of the present embodiment.

Upon reception of editing start of an existing script from a bot designer (Step S1), the editing unit 132 acquires a script for which editing start has been received from the script storage unit 121. The editing unit 132 then acquires the log of the script for which editing start has been received from the log storage unit 122 (Step S2). The editing unit 132 displays an editing screen of the acquired script on the display unit 111.

The editing unit 132 displays respective paths while changing the thicknesses thereof according to the number of outputs of contents based on an acquired log (Step S3). The editing unit 132 receives editing of the script on the editing screen being displayed.

The editing unit 132 determines whether a path has been selected (Step S4). Upon determination that a path has been selected (YES at Step S4), the editing unit 132 displays data corresponding to the selected path (Step S5), and proceeds to Step S6. Upon determination that a path has not been selected (NO at Step S4), the editing unit 132 proceeds to Step S6.

The editing unit 132 determines whether an operation of editing end has been received from the bot designer (Step S6). When the operation of editing end has not been received (NO at Step S6), the editing unit 132 returns to Step S4 to continue editing of the script. When the operation of editing end has been received (YES at Step S6), the editing unit 132 stores the edited script in the script storage unit 121 (Step S7), to finish the script-editing process. Due to this process, the information processing apparatus 100 can support the editing work of the script of an interaction scenario.

As described above, the information processing apparatus 100 controls, according to the input, which branch is to be selected to display corresponding contents, of the interaction scenario having a plurality of branches stored in the script storage unit 121. Further, the information processing apparatus 100 stores the information specifying the selected branch in the log storage unit 122. The information processing apparatus 100 also generates letters or marks corresponding to each of the branches to display the flow of the interaction scenario. When displaying the flow of the interaction scenario, the information processing apparatus 100 refers to the information stored in the log storage unit 122, to generate and display a display screen on which the information indicating which branch of the interaction scenario has been selected and how many times it has been selected is displayed by using letters or diagrams. As a result, the information processing apparatus 100 can support the editing work of the interaction scenario.

The information processing apparatus 100 displays the time taken to select the branch on the generated display screen. As a result, the information processing apparatus 100 can support the editing work of branch options.

Further, the information processing apparatus 100 displays the number of times a branch has been selected on the generated display screen. As a result, the information processing apparatus 100 can support the editing work of branch options.

Further, in the information processing apparatus 100, the illustration of the information indicating which branch has been selected and how many times it has been selected is a connecting line that connects letters or marks corresponding to each of the branches with each other. As a result, the information, processing apparatus 100 can display which branch has been selected and how many times it has been selected in an easily understandable manner.

The information processing apparatus 100 displays the width of the connecting line thicker with an increase in the number of times the branch has been selected. As a result, the information processing apparatus 100 can display which branch has been selected and how many times it has been selected in an easily understandable manner.

When a plurality of branches are selected according to a determination result by an artificial intelligence, the information processing apparatus 100 displays the branches in a display mode different from a branch selected unambiguously according to an input. As a result, the information processing apparatus 100 can display branches determined by the artificial intelligence in an easily understandable manner.

In the embodiment described above, a chatbot of a home loan has been described as an example. However, the present invention is not limited thereto. For example, similarly with respect to a chatbot in which a script of an interaction scenario regarding manuals and FAQs (Frequently Asked Questions) of various types of apparatuses is operated, a selection history of options can be displayed at the time of editing the script.

In the embodiment described above, the script of the interaction scenario is operated in the information processing apparatus 100. However, the present invention is not limited thereto. For example, it is possible to have a configuration that a server that causes a script to be operated is provided separately from the information processing apparatus 100, and the script is edited by the information processing apparatus 100 by remotely accessing the server.

In the embodiment described above, paths are displayed while the thicknesses thereof are changed according to the number of passages in each path. However, the present invention is not limited thereto. For example, it can be proposed to move a route in the options having a large number of passages in the path to a left side or an upper side in a map on the editing screen. Further, the information processing apparatus 100 can automatically display the route in the options having a large number of passages in the path on the left side or the upper side in the map on the editing screen.

In the embodiment described above, when a path is selected, data corresponding to the path is displayed. However, the present invention is not limited thereto. For example, it is possible to configure that, when a mouse is placed over the path, data corresponding to the path is displayed.

In the embodiment described above, paths are displayed while the thicknesses thereof are changed according to the number of passages in each path. However, the present invention is not limited thereto. For example, it can be proposed to delete a node belonging to a path having a few number of passages.

Incidentally, components of each unit illustrated in the drawings do not necessarily have to be physically configured as illustrated in the drawings. That is, the specific mode of distribution and integration of the respective elements is not limited to the illustrated ones, and a part or all thereof can be functionally or physically distributed or integrated in an arbitrary unit, according to various kinds of loads, the use status, and the like. For example, the scenario control unit 131 and the collecting unit 133 can be integrated with each other. The order of respective processes illustrated in the drawings is not limited to the order described above, and these processes can be performed simultaneously or in different orders within a scope in which processing contents of the respective processes do not contradict to one another.

Further, as for the respective processing functions executed in the respective devices, an arbitrary part or all of these functions can be executed OR a CPU (or a microcomputer such as an MPU or an MCU (Micro Controller Unit)). It is needless to mention that an arbitrary part or all of the respective processing functions can be executed on a program, analysed and executed, by a CPU (or a microcomputer such as an MPU or ah MCU) or on hardware by a wired logic.

Figure 7:
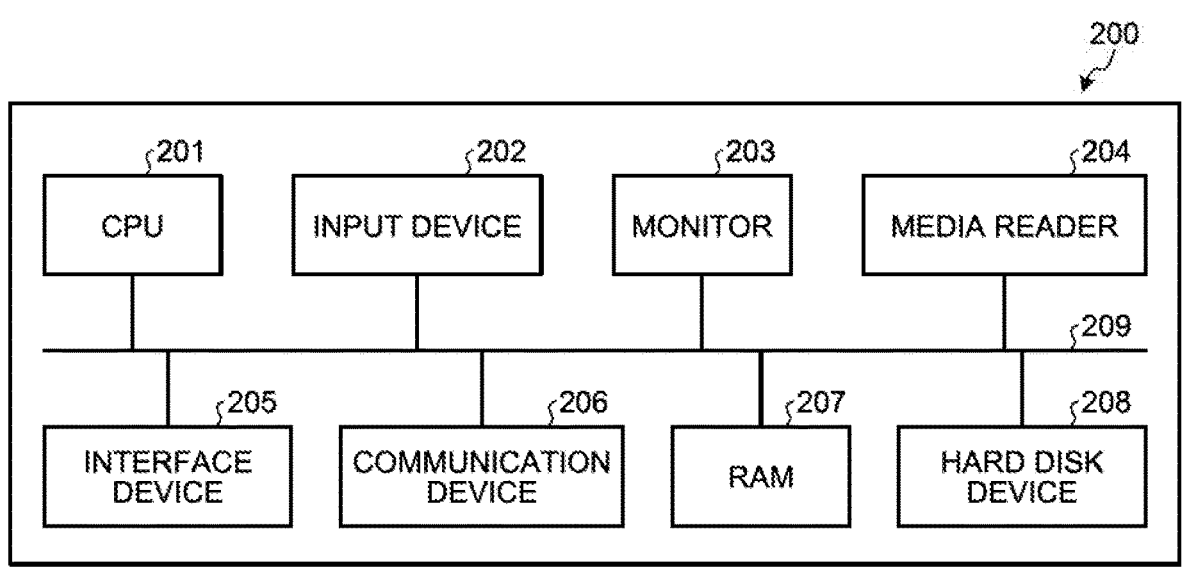
FIG. 7 is a diagram illustrating an example of a computer that executes a display control program of an interaction scenario.

The respective processes described in the above respective embodiments can be realized, by executing a program on a computer. In this connection, in the following descriptions, an example of a computer that executes a program having functions identical to those described in the above respective embodiments is explained. FIG. 7 is a diagram illustrating an example of a computer that executes a display control program of an interaction scenario.

As illustrated in FIG. 7, a computer 200 includes a CPU 201 that performs various types of arithmetic processing, an input device 202 that accepts a data input, and a monitor 203. The computer 200 also includes a media reader 204 that reads programs or the like from a storage medium, an interface device 205 for connecting the computer 200 to various devices, and a communication device 206 for connecting the computer 200 to other information processing apparatuses in a wired or wireless manner. The computer 200 further includes a RAM 207 that temporarily stores various pieces of information and a bard disk device 208. The respective devices 201 to 208 are connected to a bus 209.

In the hard disk device 208, an interaction scenario display control program, having the same functions as those of respective processing units of the scenario control unit 131, the editing unit 132, and the collection unit 133 illustrated in FIG. 1 is stored. Further, the script storage unit 121, the log storage unit 122, and various types of data for realizing the interaction scenario display control program are stored in the hard disk device 208. The input device 202 accepts an input of various pieces of information such as operation information from an administrator of the computer 200. The monitor 203 displays various screens such as an editing screen to the administrator of the computer 200. The interface device 205 has, for example, a printing device connected thereto. The communication device 206 has the same functions as those of the communication unit 110 illustrated in FIG. 1, and is connected to a network (not illustrated), thereby transferring various pieces of information with other information processing apparatuses.

The CPU 201 reads the respective programs stored in the hard disk device 208 and loads and executes the programs in the RAM 207, thereby performing various types of processing, These programs can cause the computer 200 to function as the scenario control unit 131, the editing unit 132, and the collection unit 133 illustrated in FIG. 1.

The interaction scenario display control program described above does not always need to be stored in the hard disk device 208. For example, the computer 200 can read out and execute a program stored in a storage medium readable by the computer 200. The storage medium readable by the computer 200 corresponds to a portable recording medium such as a CD-ROM, a DVD disk, or a USB memory, a semiconductor memory such as a flash memory, a hard disk drive, or the like. Further, it is also possible to configure that the interaction scenario display control program is stored in a device connected to a public line, the Internet, or the LAN, and the computer 200 reads out and executes the interaction scenario display control program from the device.

The editing work of an interaction scenario can be supported.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority: and inferiority of the invention. Although the embodiment of the present invention has been, described in detail, it should be understood that the various changes, substitutions, and alterations could be made hereto without departing from the spirit and scope of the invention.

What is claimed is:

1. A non-transitory recording medium having recorded therein an interaction scenario display control program that causes a computer to execute a process comprising:

controlling, according to an input, which branch is to be selected to display corresponding contents, of an interaction scenario having a plurality of branches that is stored in a storage unit;

storing information specifying a selected branch in the storage unit; and generating and displaying an editing screen on which information indicating which branch of the interaction scenario has been selected and how many times it has been selected is displayed by using letters or illustrations, at a time of generating letters or marks corresponding to each of the branches and displaying a flow of the interaction scenario, by referring to information stored in the storage unit, the editing screen displaying an acquired script for which editing start has been received and a script for displaying a log of the acquired script, wherein when the branches are selected according to a determination result of an artificial intelligence, the branches are displayed in a display mode different from a branch selected unambiguously according to the input.

2. The non-transitory recording medium according to claim 1, wherein a time taken to select the branch is displayed on the display screen to be generated.

3. The non-transitory recording medium according to claim 1, wherein number of times the branch has been selected is displayed on the display screen to be generated.

4. The non-transitory recording medium according to claim 1, wherein an illustration of the information indicating which branch has been selected and how many times it has been selected is a connecting line that connects letters or marks corresponding to each of the branches to each other.

5. The non-transitory recording medium according to claim 4, wherein a width of the connecting line is displayed thicker with an increase in number of times the branch has been selected.

6. An interaction scenario display control method for causing a computer to execute a process comprising:

controlling, according to an input, which branch is to be selected to display corresponding contents, of an interaction scenario having a plurality of branches that is stored in a storage unit;

storing information specifying a selected branch in the storage unit, using the processor; and generating and displaying an editing screen on which information indicating which branch of the interaction scenario has been selected and how many times it has been selected is displayed by using letters or illustrations, at a time of generating letters or marks corresponding to each of the branches and displaying a flow of the interaction scenario, by referring to information stored in the storage unit, the editing screen displaying an acquired script for which editing start has been received and a script for displaying a log of the acquired script, using the processor, wherein when the branches are selected according to a determination result of an artificial intelligence, the branches are displayed in a display mode different from a branch selected unambiguously according to the input.

7. The interaction scenario display control method according to claim 6, wherein a time taken to select the branch is displayed on the display screen to be generated.

8. The interaction scenario display control method according to claim 6, wherein number of times the branch has been selected is displayed on the display screen to be generated.

9. The interaction scenario display control method according to claim 6, wherein an illustration of the information indicating which branch has been selected and how many times it has been selected is a connecting line that connects letters or marks corresponding to each of the branches to each other.

10. The interaction scenario display control method according to claim 9, wherein a width of the connecting line is displayed thicker with an increase in number of times the branch has been selected.

11. An information processing apparatus comprising:

a processor, wherein the processor executes a process comprising:

controling, according to an input, which branch is to be selected to display corresponding contents, of an interaction scenario having a plurality of branches that is stored in a storage unit;

storing information specifying a selected branch in a storage unit; and generating and displays an editing screen on which information indicating which branch of the interaction scenario has been selected and how many times it has been selected is displayed by using letters or illustrations, at a time of generating letters or marks corresponding to each of the branches and displaying a flow of the interaction scenario, by referring to information stored in the storage unit, the editing screen displaying an acquired script for which editing start has been received and a script for displaying a log of the acquired script, wherein when the branches are selected according to a determination result of an artificial intelligence, the branches are displayed in a display mode different from a branch selected unambiguously according to the input.

12. The information processing apparatus according to claim 11, wherein a time taken to select the branch is displayed on the display screen to be generated.

13. The information processing apparatus according to claim 11, wherein number of times the branch has been selected is displayed on the display screen to be generated.

14. The information processing apparatus according to claim 11, wherein an illustration of the information indicating which branch has been selected and how many times it has been selected is a connecting line that connects letters or marks corresponding to each of the branches to each other.

15. The information processing apparatus according to claim 14, wherein a width of the connecting line is displayed thicker with an increase in number of times the branch has been selected.

* * * * *